June 18, 1946. G. N. LE SAGE 2,402,420

DOUGH DEGASSER

Filed March 10, 1945

INVENTOR.
Grover N. LeSage
BY
ATTORNEY.

Patented June 18, 1946

2,402,420

UNITED STATES PATENT OFFICE 2,402,420

DOUGH DEGASSER

Grover N. Le Sage, Kansas City, Mo.

Application March 10, 1945, Serial No. 582,037

5 Claims. (Cl. 107—12)

This invention relates to apparatus for handling and treating dough in the production of bread, and has for its primary aim the provision of a unit for degassing, stretching and twisting a dough piece after it has been divided and prior to its introduction to a molder or pressing unit for passage into the baking pan.

Another object of this invention is the provision of a dough degassing and twisting apparatus for bakery equipment, comprising specially disposed elements for simultaneously twisting, squeezing and stretching the dough piece as it moves through a relatively short path of travel.

This invention has for a further object, to provide mechanical means for quickly handling a dough piece to remove therefrom any excess gas and to manipulate the same to reduce the grain throughout its body into a fine texture so desirable in the finished product.

Other objects of the invention including the specific instrumentality by means of which the dough is handled, will appear during the course of the following specification, referring to the accompanying drawing, wherein.

The trade recognizes that a so-called "twisted" loaf of bread is of generally finer texture and more desirable than loaves that have not been freed of a substantial portion of the gas created therein during the processing of the batch thereof. The most successful way of producing a twisted loaf of bread having the above mentioned characteristics, is to manually manipulate the dough piece to "braid" the attenuated dough piece just prior to its introduction into the baking pan. Such procedure is objectionable from the standpoint of expenditure of time and money, and therefore, the twisted loaf of bread has virtually disappeared from the market.

The form of a twisted loaf of bread is also sometimes objectionable because of the deep undulations found in the crust portions. The apparatus about to be described and embodying my invention, is capable of handling a dough piece in such fashion as to obtain the same result as have heretofore been desirable and that resulted in the manufacture of a twisted loaf as above set forth.

The form of the invention chosen for illustration comprises a hollow body in the nature of a chute 10, having its longitudinal axis disposed vertically and below an outlet port 12 through which the dough piece, not here illustrated, may pass from the proofer portion of the baking equipment, or any other conveying means that may be desired. Chute 10 is preferably directly above the means for contouring the dough piece before it is introduced into the baking pan.

Apparatus for handling the dough piece after it passes through the degasser, is shown in my copending application, filed on even date herewith.

Figure 1:
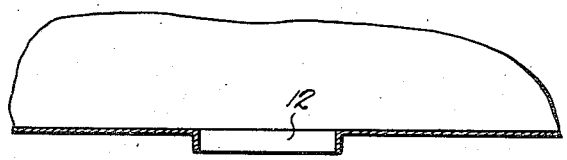
Fig. 1 is a side elevational view of a dough degasser made to embody the present invention.
Figure 1:
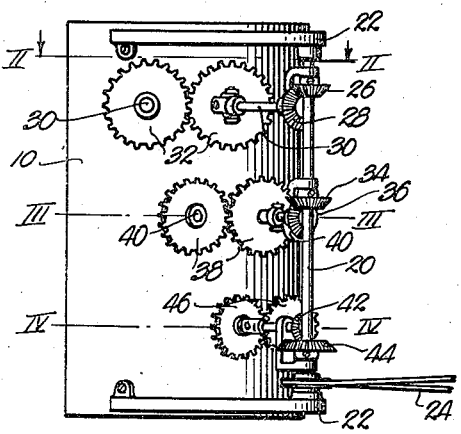
Figure 3:
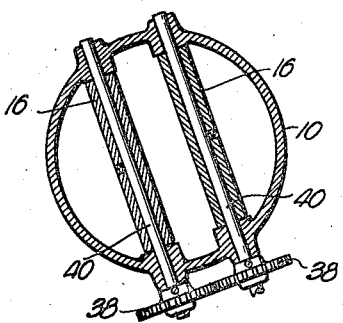
Fig. 3 is a similar cross sectional view taken on line III—III of Fig. 1.
Figure 2:
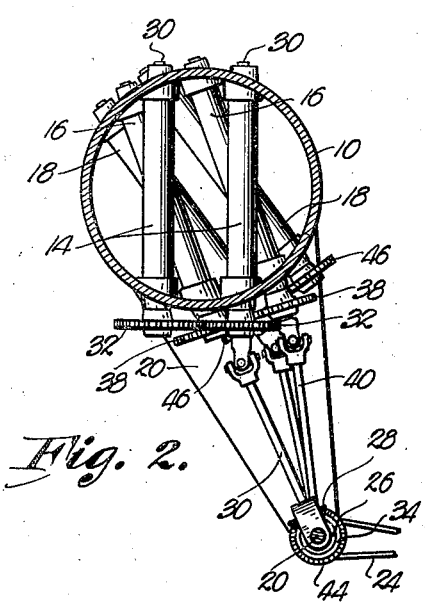
Fig. 2 is a horizontal cross sectional view therethrough, taken on line II—II of Fig. 1.
Figure 4:
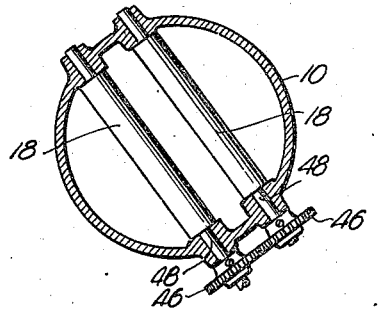
Fig. 4 is a cross sectional view taken on line IV—IV of Fig. 1.

A plurality of rollers disposed within chute 10 and having their axes on horizontal planes, are arranged in pairs. The uppermost pair of rollers 14 are spaced apart a distance slightly greater than the distance between the next underlying pair of rollers 16. The lowermost pair of rollers 18 are still closer together than either rollers 14 or 16, and therefore, as the dough piece passes downwardly between the three sets of rollers, a squeezing action is established. It is progressively confined to a greater degree as it approaches lower rollers 18, and because of the disposition of these rollers, as clearly shown in Fig. 2, the dough piece is distorted into a spiral unit because of the spiral path created by the several pairs of rollers in chute 10. The angularity of disposition of these rollers from the uppermost pair of rollers 14 to the lowermost pair of rollers 18, should be approximately 30°.

Means for driving the several pairs of rollers must be provided and the chosen embodiment of the drive is here illustrated to be a common vertical shaft 20 journalled in bearings 22 mounted on chute 10 and actuated through the medium of a belt 24 extending to a source of power, not here shown.

A set of gears comprising members 26 and 28 join shaft 20 to shaft 30 upon which one of rollers 14 is mounted. Meshing gears 32 on shafts 30 insure that rollers 14 will rotate in opposite directions to feed the dough piece therebetween.

In a similar manner, bevel gears 34 and 36 drive meshing gears 38 on shafts 40 that carry rollers 16. Gears 42 and 44 drive meshed gears 46 mounted on shafts 48, which carry rollers 18.

The speed of rollers 18 which comprise the lowermost pair thereof, is greater than the speed of rollers 16 comprising the intermediate pair, and in turn, the speed of uppermost rollers 14 is smaller than the intermediate pair of rollers 16. Thus, a dough piece is gently stretched as it passes through chute 10 and simultaneously with said stretching, the entire body is twisted through a substantially 30° angle.

All of the rollers will gently slap the surface of the dough to simulate to the greatest possible extent, the manual manipulation that has heretofore proven so beneficial in producing a twisted loaf of bread. The grain of the dough piece will be rendered fine due to the stretching and twisting, and when the dough piece is dropped into the pressing and feeding apparatus which underlies chute 10, it will be shaped to enter the baking pan without destroying the desirable characteristics imparted thereto through the action of the mechanism just described.

Having thus described the invention, what is claimed as new and desired to be secured by Letters Patent is:

1. Degassing and twisting apparatus for dough handling equipment comprising a substantially vertical chute having a plurality of dough engaging rollers therein; and means for rotating the rollers to move the dough piece through the chute, said rollers being arranged in pairs, the pairs of rollers being spaced apart and one above the other with the rollers of each pair in substantially the same horizontal plane, each pair of rollers underlying the uppermost pair of rollers being arranged with their respective vertical planes offset with respect to the pair of rollers next above to present progressive angles of divergence to form a spiral path of travel for the dough piece as it moves through the chute whereby the dough piece is twisted through at least a thirty degree turn before being ejected from the lowermost pair of rollers.

2. Degassing and twisting apparatus for dough handling equipment comprising a substantially vertical chute having a plurality of dough engaging rollers therein; and means for rotating the rollers to move the dough piece through the chute, said rollers being arranged in pairs, the pairs of rollers being spaced apart and one above the other with the rollers of each pair in substantially the same horizontal plane, each pair of rollers underlying the uppermost pair of rollers being arranged with their respective vertical planes offset with respect to the pair of rollers next above to present progressive angles of divergence to form a spiral path of travel for the dough piece as it moves through the chute, said rollers of the pairs being spaced progressively closer together as the lowermost pair of rollers is approached.

3. Degassing and twisting apparatus for dough handling equipment comprising a substantially vertical chute having a plurality of dough engaging rollers therein; and means for rotating the rollers to move the dough piece through the chute, said rollers being arranged in pairs, the pairs of rollers being spaced apart and one above the other with the rollers of each pair in substantially the same horizontal plane, each pair of rollers underlying the uppermost pair of rollers being arranged with their respective vertical planes offset with respect to the pair of rollers next above to present progressive angles of divergence to form a spiral path of travel for the dough piece as it moves through the chute whereby the dough piece is twisted through at least a thirty degree turn before being ejected from the lowermost pair of rollers, said rollers having power actuated driving means, the rollers of the uppermost pair being driven at a slower rate of speed than the rollers of the remaining pairs, and the rollers of the pairs underlying the uppermost pair being driven progressively faster as the lowermost pair of rollers is approached.

4. Degassing and twisting apparatus for dough handling equipment comprising a substantially vertical chute having a plurality of dough engaging rollers therein; and means for rotating the rollers to move the dough piece through the chute, said rollers being arranged in pairs, the pairs of rollers being spaced apart and one above the other with the rollers of each pair in substantially the same horizontal plane, each pair of rollers underlying the uppermost pair of rollers being arranged with their respective vertical planes offset with respect to the pair of rollers next above to present progressive angles of divergence to form a spiral path of travel for the dough piece as it moves through the chute whereby the dough piece is twisted through at least a thirty degree turn before being ejected from the lowermost pair of rollers, said rollers of the pairs being spaced progressively closer together as the lowermost pair of rollers is approached.

5. In dough handling equipment for twisting and stretching a dough piece, a chute; a plurality of rollers arranged in pairs one above the other, transversely of the chute; and means for driving the rollers of each pair, each pair of rollers underlying the uppermost pair of rollers being arranged with their respective vertical planes offset with respect to the pair of rollers next above to present progressive angles of divergence to form a spiral path of travel of a length to be occupied by a dough piece as it passes between the pairs of rollers, the dough piece being held in stretched condition by the rollers as it is in the spiral path whereby the dough piece is degassed and the grain thereof is rendered finer in texture.

GROVER N. LE SAGE.